April 2, 1968     A. J. NABER ETAL     3,375,974

AIRCRAFT COMPUTER

Filed Dec. 8, 1966

INVENTORS.
ALBERT J. NABER
PHYLLIS L. NABER
BY
ATTORNEY.

3,375,974
AIRCRAFT COMPUTER
Albert J. Naber and Phyllis L. Naber, both of Rte. 2,
Box 277B, Tucson, Ariz. 85715
Filed Dec. 8, 1966, Ser. No. 600,078
6 Claims. (Cl. 235—61)

ABSTRACT OF THE DISCLOSURE

A load and center of gravity computer for pilots having weight-moment scales and a numerical-total addiator, a graph on which the total weight and total moment are indexed and a safe-limit zone-marking on the graph.

---

Figure 1:
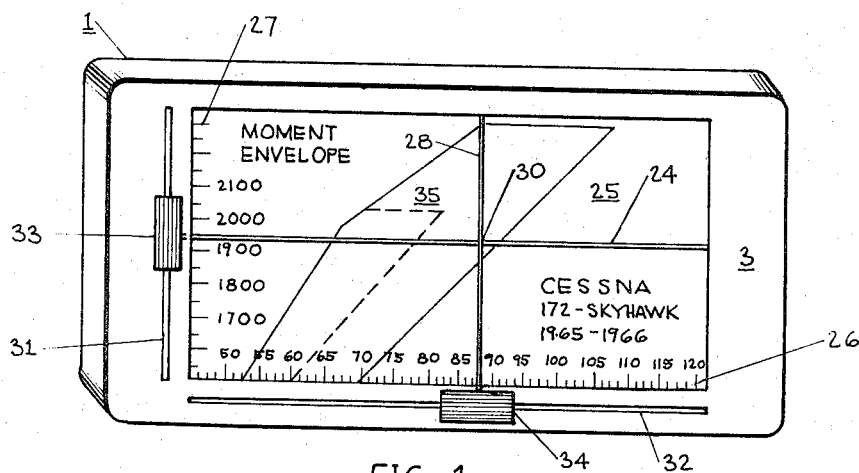

This invention relates to a mechanical computing device, and more particularly to a manually operated calculating instrument for computing aircraft weight and balance.

It is a general object of our invention to provide a compact, easily operated instrument which enables the pilot to determine whether his aircraft is loaded within prescribed weight and center of gravity limitations.

It is another object of our invention to provide an aircraft weight and balance computer of a basic design which may be adapted for use for most all types of aircraft.

It is a specific object of our invention to provide an aircraft weight and balance computer which is simple and easy to operate.

Another object of our invention is to provide a mechanical weight and balance calculator which is accurate and inexpensive to construct.

Other objects of our invention will become apparent upon a reading of the following specification and claims.

For each type and model of aircraft, there are certain limitations on the weight and distribution of that weight that can safely be accommodated. A properly loaded aircraft, therefore, has its center of gravity, which is a function of these weights and their distribution as well as aircraft design, within well defined limits. Failure of the pilot to observe these limitations will cause dangerous and unstable takeoff and flight characteristics.

For determining whether loads are acceptable, many pilots use a pencil and paper method for determining the total weight and moment (weight times distance from the center of gravity of the aircraft) caused by the respective weights.

The pencil and paper method has been improved upon by the availability of a number of calculators usually of the linear or circular slide rule type. These known apparatus are usually hard to operate and cumbersome. Further, they are often expensive and require the operator to be skillful in performing a number of complex computations. Hence, it becomes obvious that there is a need for a simple, easily operated, aircraft weight and balance computer that is inexpensive enough so that it is available to all pilots.

Our invention consists of an instrument case or frame on one side of which calculating means are provided for determining the numerical values for aircraft weight and moment. On the opposite side of our instrument is a moment graph on which the coordinates are load weight and moment. On this graph is also indicated an area, the moment envelope, which represents the acceptable range for these values. The point of intersection of the loading and moment, as determined on the calculator side of the instrument, must be within the moment envelope for permissible safe aircraft loading.

Our instrument avoids many of the deficiencies found in the prior art devices as it is direct reading, simple and accurate. As a further advantage our device does not have multiple cooperative scales requiring simultaneous or sequential manipulation by the user.

The invention will be more clearly understood by referring to the accompanying drawings wherein like numbers identify similar elements.

Figure 2:
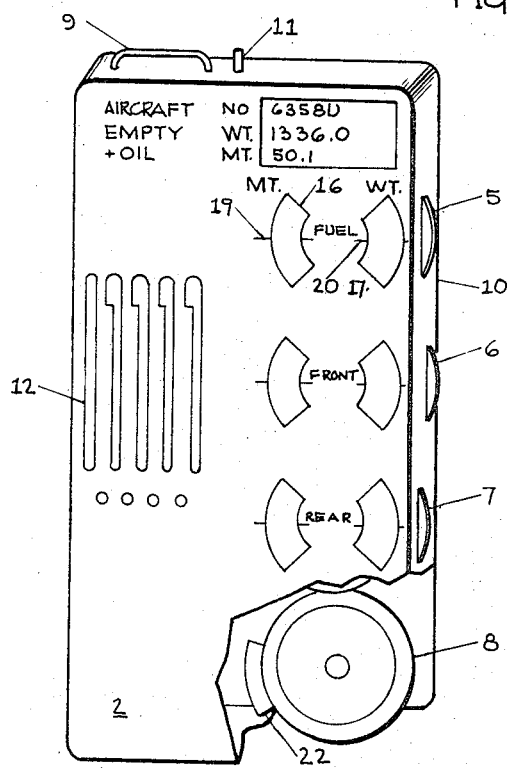
Figure 3:
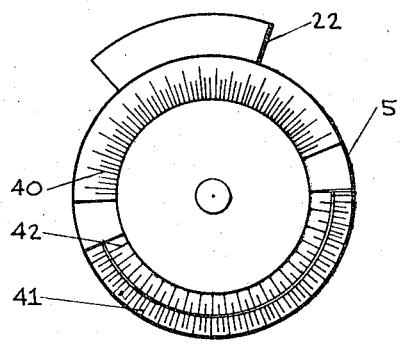

FIG. 1 is a perspective view of the graph side of our computer on which the coordinates are aircraft weight and moment;

FIG. 2 is a perspective view of the computer side of our device with a corner section broken away to better illustrate the mounting of the indicating dials; and FIG. 3 is a detail view of the fuel indicating dial. The case 1 of the computer, in the preferred form of our invention, is generally flat and rectangular in shape and is of a size for convenient operation in one hand and may be of any suitable material such as aluminum or plastic. One side 2 of the computer is designated as the calculator side and the other side 3 of our computer is designated the graph side on which the loaded aircraft moment and loaded aircraft weight are plotted and on which is indicated the moment envelope. These latter mathematical functions are discussed in greater detail hereinafter.

On the computer side 2 a number of indicating dials or scales 5, 6, 7, and 8 having scales graduated in moment and weight are pivotally mounted within the case 1 by a pin or rivet. These dials are preferably mounted in relation to the edge of the case 1 so that a segment of the outer edge 3 as seen in FIG. 2 of the dial 5 extends through a slot 10 provided in the side of the case 1. The outer periphery of the dials are knurled to facilitate rotation of the segment extending through the case by the user. If desired, these dials could also be rotated by a center knob or any other means allowing manipulation by the user. The form of the device as shown in FIGURE 2 has four dials rotably mounted within the case 1 as would be provided for an aircraft having only front and rear seats. Dials 6 and 7 are for computing the loads for the front and rear seats and dials 5 and 8 are for computing the loads due to fuel and baggage, respectively. It being understood that additional dials would be added as necessary for an instrument designed for an aircraft having more points of load, such as additional seats.

Also located on the computer side 2 of the instrument is calculating means 12 suitable for performing simple arithmetic computation. The calculator is shown as a small mechanical machine of the abacus type of known construction which can be operated with a pencil tip or stylus 11 which is conveniently inserted in a cylinder, not shown, formed in the case for storage and easy access. The lever 9 is for clearing the calculator when computations are completed.

The indicating dial 5 for the fuel loading computation is shown in greater detail in FIGURE 3 where it can be seen that the upper half of the dial surface is calibrated in units of moment 40 mathematically related to the lower half scale 41 which shows weight. It will be easily understood that, for practical purposes, the loading due to fuel always acts at approximately the same point, that is, a fixed distance from the unloaded center of gravity of the aircraft, thus the mathematical relationships between weight and moment is readily fixed. Also on the lower half of the fuel dial scale, for convenience, the weight of the fuel may read directly on inner scale 42 once the gallonage has been set on outer scale 41 as the specific gravity of the fuel is relatively constant. The remaining dials 6, 7, and 8 for passengers and baggage are graduated in weight only and have a scale mathematically related thereto for determining the moment due to each loading.

Mounted in the surface of the case above each dial on the calculator side are provided a pair of semi-annular indicating windows 16 for moment and 17 for weight through which these values may be read. Indices 19 and 20, in the form of a hairliness, are provided for each window and cooperate in setting and reading the dial scales. The stop 22, as best seen in FIG. 3, prevents the dial scale from being rotated too far in either direction as the stop contacts outer edge of the dial case.

Also on the calculator side of our instrument is basic information for the particular aircraft such as the license number, licensed empty weight, and empty aircraft moment which takes into consideration a full oil supply is shown. In the example, the aircraft has an empty positive moment of 50.1 and empty weight of 1336.0 pounds. A positive moment arbitrarily is caused by loading to the rear of the center of gravity.

Referring again to FIGURE 1, it will be seen that the graph side 3 of our instrument has a linear graph 25 mounted flush with the surface of the case on which the abscissa 26 is graduated in units of moment and the ordinate 27 is graduated in units of weight. The convenient unit pound inches/1000 may be used for moment and weight is indicated in pounds. Indices 28 and 29 for ease of locating a point on the graph are slidably mounted to read across the full scale of the abscissa and ordinate, respectively. This may easily be accomplished by having grooves 31 and 32 in the case into which slides 33 and 34 fit, the indices being attached to the runners. The slides can be moved longitudinally and vertically as desired. On the face of the graph 25 moment envelope 35 is outlined, the shape being dependent upon the particular aircraft type. The envelope actually represents the prescribed range of weight and moment variations, within which the aircraft may be safely operated. It will be noted that the particular graph is for the Cessna 172 Skyhawk. The same instrument could be interchangeably used for another two or four place aircraft by simply inserting the proper graph for the type of aircraft beneath the indices and changing the dials 5, 6, 7, and 8 to have the proper weight-moment relationship for the particular type of aircraft.

A further understanding of the construction and operation of our instrument will be apparent from the following example. The first step in checking aircraft loading when using our instrument is for the pilot to determine the individual weight components. The computation is as follows: the total number of gallons of fuel carried by the aircraft is placed under hairline index 20 by rotating dial 5 in the proper direction. Since the point where the load due to the fuel acts is relatively constant, a reading of the moment is indicated under hairline 19 in view window 16. Note too, that the total weight represented by this number of gallons can be directly read from scale 42 on dial 5 under hairline 20.

In a similar manner, the total weight of the pilot and passengers in the front seat is estimated and set under hairline 20 by rotating dial 6. A corresponding moment value caused by this weight is indicated on the moment scale of dial 6 under hairline 19. The same operation is repeated using dials 7 and 8 for determining the moment due to the rear seat passengers and the baggage.

The next step is to totalize all the weights components, front and rear seats, baggage, fuel, and empty aircraft weight, on the calculator 12. These weights are all indicated under hairlines on dials 5, 6, 7, 8, and the operator simply adds them along with the licensed empty weight arithmetically on calculator 12 using the stylus 11 provided. Once this total is established and the calculator cleared the case is turned over and slide 33 is moved vertically in slot 31 until index 29 is horizontally lined up on scale 27 with the total weight value as determined. This is shown as approximately 1,950 pounds in FIG. 1. Now the total moment value is established in the same manner by adding the individual components as shown on the left hand dial scale along with the empty moment on calculator 12. The computer is again turned over and runner 34 is moved until inder 28 is coincident with the correct total moment value on horizontal scale 26. In FIG. 1, this is shown at 87 pound inches/1000. The point of intersection 30 of indices 28 and 29 is noted and compared with the moment envelope area. As seen in FIG. 1, the loading is acceptable as point 30 is within the boundaries of the moment envelope 35 and the pilot may take off. In the point of intersection 30 is not within envelope 39, the load should be redistributed or lessened and the pilot should recalculate using the new loadings.

It will be clear to those skilled in the art that minor modifications in design of our invention and physical location of the components can be made without departing from the spirit and scope of our invention.

We claim:

1. A mechanical computer for determining whether an aircraft having loading components applied at various points is within allowable weight and moment limitations with reference to the center of gravity comprising:
   (a) a flat rectangular case having a top side, a bottom side, end walls, and side walls, said top side having basic aircraft information thereon;
   (b) circular rotatable scale means for each loading position, said scale means having a first scale graduated in units weight and a second scale related thereto graduated in units of moment, whereby the weight of each component can be set on said first scale and the corresponding moment can be read, said scale being interchangeably mounted within the case between the top side and bottom side and being readable through windows provided in the top;
   (c) calculating means on the top side of said case for receiving and totalling the numerical values of total weight of all loading components and of total moment due to all components;
   (d) graph means for receiving the totals from said calculating means and having coordinates respectively graduated in units of weight and moment, said graph having an area indicated therein representing acceptable weight and moment relationship for the type of aircraft, said graph being interchangeably mounted on the bottom side of said case;
   (e) a slidably mounted horizontal index; and
   (f) a slidable vertical index, said horizontal and vertical indexes being aligned along different coordinates of said graph whereby the point of intersection of weight and moment can be located with respect to said area to determine if the aircraft loading is allowable.

2. A mechanical computer for determining whether an aircraft having loading components applied at various points is within allowable weight and moment limitations with reference to the center of gravity comprising a case having
   (1) scale means for determining the moment for each loading position, said scale means having a first scale graduated in units of weight and a second mathematically related scale graduated in units of moment;
   (2) calculating means for receiving and totalling the respective numerical values from said first scales to determine total weight and from said second scales to determine total moment;
   (3) graph means for receiving the totals from said calculating means and having coordinates respectively graduated in units of weight and in units of moment, said graph having an area indicated thereon and representing acceptable weight and moment relationships, and
   (4) index means cooperating with said graph for indicating on said graph the numerical totals of weight and moment received from said computing means, whereby the point of intersection of total weight and total moment can be located to determine if the aircraft loading is allowable.

3. The computer of claim 2 wherein said scale means and said totalling means are located on one side of said case and said graph means and said index means are located on the opposite side.

4. The computer of claim 2 wherein said totalizing means comprise an abacus.

5. The computer of claim 2 wherein the scale means is rotatable.

6. The computer of claim 5 wherein said rotatable scale means are mounted within said case and are readable through indicating windows provided in said case.

References Cited

UNITED STATES PATENTS

| | | | |
|---|---|---|---|
| 2,179,822 | 11/1939 | Imm | 235—61.03 |
| 2,369,420 | 2/1945 | Thurston et al. | 235—61.03 |
| 2,373,566 | 4/1945 | Imm | 235—61.03 |
| 2,541,243 | 2/1951 | Gruetjen | 235—61 |
| Re. 25,041 | 9/1961 | Clapp | 235—61 |

RICHARD B. WILKINSON, *Primary Examiner.*

S. A. WAL, *Assistant Examiner.*